United States Patent [19]

Fischer

[11] Patent Number: 4,462,515
[45] Date of Patent: Jul. 31, 1984

[54] APPARATUS FOR TRANSFERRING GROUPS OF DISC-SHAPED OBJECTS

[75] Inventor: Herbert Fischer, Emmenbrücke, Switzerland

[73] Assignee: SIG - Schweizerische Industrie-Gesellschaft, Neuhausen am Rheinfall, Switzerland

[21] Appl. No.: 344,830

[22] Filed: Feb. 1, 1982

[30] Foreign Application Priority Data

Feb. 6, 1981 [CH] Switzerland .......................... 814/81

[51] Int. Cl.³ ............................................. B65G 47/26
[52] U.S. Cl. .................................... 198/426; 198/409; 414/104; 414/115
[58] Field of Search .............. 198/409, 425, 426, 430, 198/487; 414/43, 103, 104, 115; 53/532, 542

[56] References Cited

U.S. PATENT DOCUMENTS 4,394,899 7/1983 Fluck .................................. 198/425

FOREIGN PATENT DOCUMENTS 1179142 1/1970 United Kingdom ................ 414/115

Primary Examiner—Joseph E. Valenza
Attorney, Agent, or Firm—Spencer & Frank

[57] ABSTRACT

In apparatus for transferring a group composed of a selected number of objects from a first conveying device to a second conveying device for supply, in groups, to a packaging machine, there are provided a lowering channel which is pivotal between a first position in which it can receive a group of objects from the first conveying device, and a second position in which it can transfer each such group to the second conveying device, a pivot supporting the lowering channel at one end for pivotal movement relative to a stationary axis at a location such that, when the lowering channel is in its first position the end of the lowering channel opposite to its one end is at a higher elevation than the one end, a lowering element mounted for movement along the lowering channel, and a mechanism connected to the lowering element for displacing the lowering element, during pivoting of the lowering channel from the first position into the second position, upwardly toward the location of the lowering channel end opposite to its one end when the lowering channel is in its first position.

3 Claims, 3 Drawing Figures

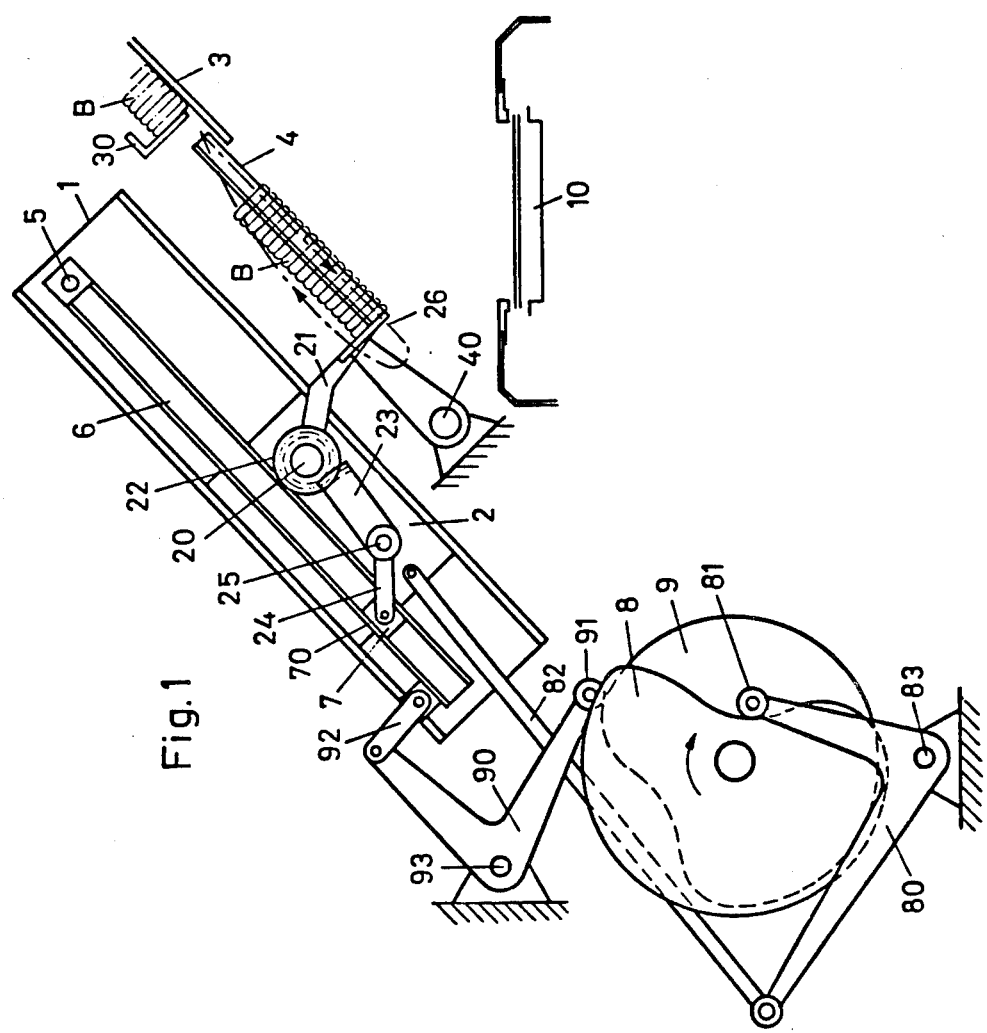

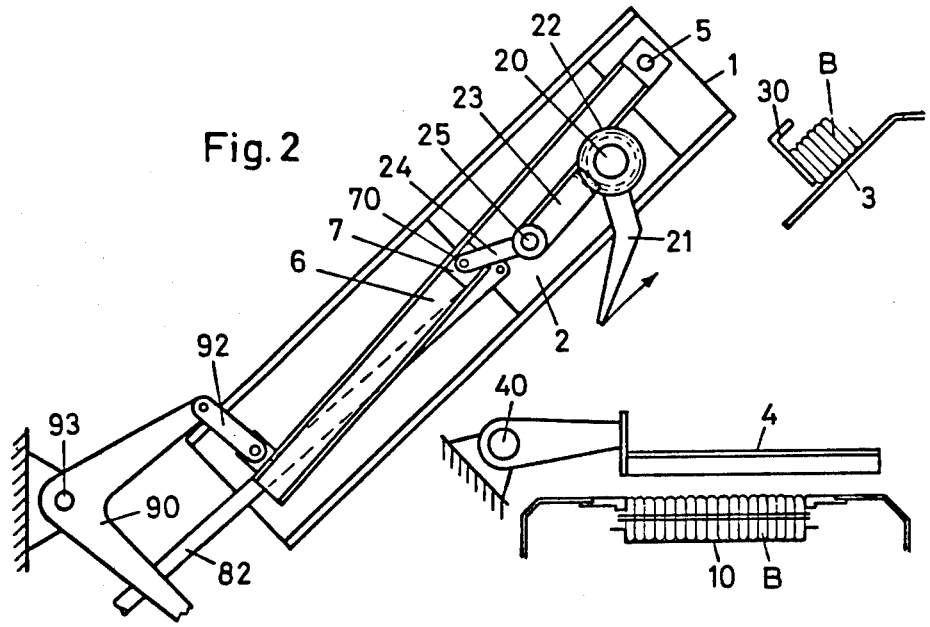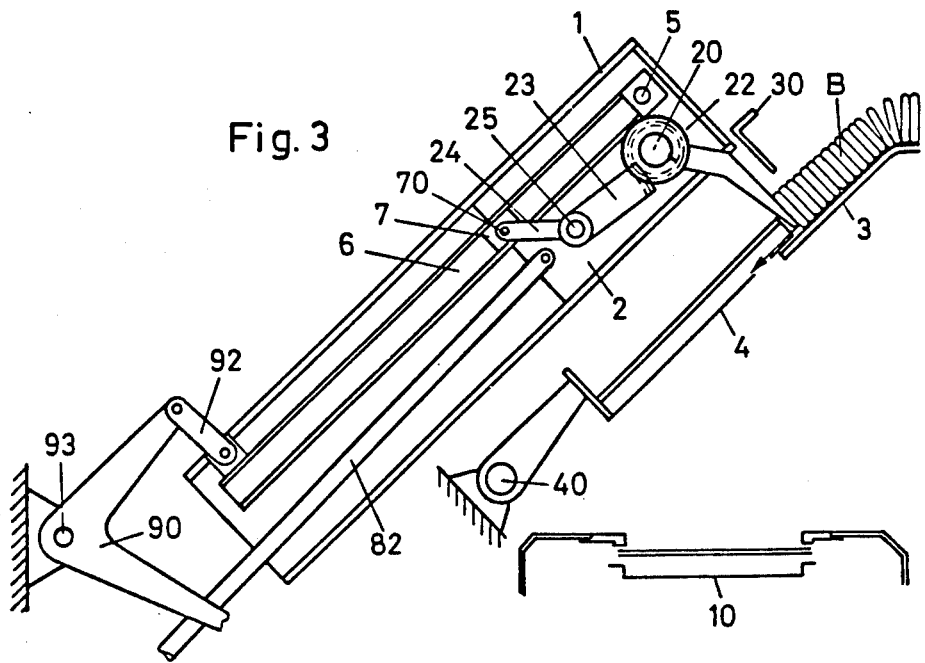

APPARATUS FOR TRANSFERRING GROUPS OF DISC-SHAPED OBJECTS

BACKGROUND OF THE INVENTION

The present invention relates to an apparatus for transferring disc-shaped objects in groups from a grouping station to a packaging machine.

Apparatus for separating stacks of disc-shaped objects, particularly cookies, which arrive in stacks of a certain length in a suitable channel, by means for holding and lowering the objects and means for separating a respective stack by holding back the object following that stack is disclosed in Swiss Auslegeschrift [Published patent application] No. 476,598. This publication also discloses an operating phase in which such a separated stack is removed from the channel and deposited on a lower level conveying path. This is accomplished by means of a gripper assembly including two clamping jaws.

Such an arrangement results in an operating rhythm which has an influence all the way to the oven, because no more objects must be produced and discharged than can be removed by the gripper assembly, so that the total output of the system, including the subsequent packaging machine, must be dimensioned for this operating rhythm. An increase in the output can thus be realized only if the operating rhythm of the gripper assembly can be improved.

SUMMARY OF THE INVENTION

It is therefore an object of the present invention to provide a novel apparatus which makes possible a higher production rate in a manufacturing and packaging line for cookies.

The above and other objects are achieved, according to the invention, in apparatus for transferring a group composed of a selected number of objects from a first conveying device to a second conveying device for supply, in groups, to a packaging machine, by the provision of: means defining a lowering channel which is pivotal between a first position in which it can receive a group of objects from the first conveying device, and a second position in which it can transfer each such group to the second conveying device; means supporting the lowering channel at one end for pivotal movement relative to a stationary axis at a location such that, when the lowering channel is in its first position the end of the lowering channel opposite to its one end is at a higher elevation than the one end; means defining a lowering element mounted for movement along the lowering channel; and means connected to the lowering element for displacing the lowering element, during pivoting of the lowering channel from the first position into the second position, upwardly toward the location of the lowering channel end opposite to its one end when the lowering channel is in its first position.

One embodiment of the invention will be described below with the aid of the drawing.

BRIEF DESCRIPTION OF THE DRAWING

FIG. 1 is a schematic elevational view of a preferred embodiment of an apparatus according to the invention.

FIGS. 2 and 3 are similar views of the apparatus of FIG. 1 showing two different operating phases of the apparatus.

DESCRIPTION OF THE PREFERRED EMBODIMENTS

The production of cookies, which are usually disc-shaped, involves baking them in an oven and then pushing them into a cooling zone. The cooling zone is usually followed by an equalization path in which the spacing between the cookies is equalized and where the cookies are aligned, i.e. placed upright onto one of their narrow sides. In a subsequent, obliquely downwardly directed section, the resulting continuous row of cookies is divided, by means of an aggregation and separating member, into uniform stacks, or groups, each having the same stack length. These arrangements are known to any person skilled in the art and are described, for example, in the above-mentioned publication as well as the publications referred to therein. A detailed description will therefore not be given at this point, particularly since the present invention does not relate directly to either the assembly or the alignment of the row of cookies, or subdivision into groups.

FIG. 1 is a schematic representation of a guide 1 for guiding the lowering of a translatorily displaceable lowering carriage 2. This guide 1 is fixed to the machine housing and is provided at its upper end, i.e. at the point of transfer from an obliquely downwardly oriented section 3 to a lowering channel 4, with a bearing pin 5 for pivotably holding a control rail 6 guiding a slide block 7. There are also provided cams 8 and 9 which rotate in unison to provide synchronized movements of the control rail 6 and the lowering carriage 2.

The lowering carriage 2 is provided with a lowering element 21 pivotally mounted on a journal bearing 20 and driven in a manner to fill the lowering channel 4 with a group of objects B prepared in section 3. For this purpose, the lowering element 21 is moved downwardly along the lowering guide 1 by the lowering carriage 2 under the control provided by the cam 8 and an angle lever 80 pivotally mounted on the machine frame at 83 and having one arm carrying a sensing roller 81 engaging cam 8 and a second arm pivoted to a connecting rod 82 whose other end is articulated to carriage 2. Thus, the movement of carriage 2 along guide 1 is controlled by the form of cam 8.

The lowering element 21 is rigidly connected to a toothed gear wheel 22 which meshes with a toothed gear wheel segment 23. The toothed gear segment 23 together with a setting arm 24 forms an angle lever whose fulcrum is constituted by a pivot pin 25 carried by the lowering carriage 2.

The free end of setting arm 24 is likewise pivotally mounted on a journal 70 carried by the slide block 7. Pivotal movement of the control rail 6 is controlled by the cam 9 via an angle lever 90 and a sensing roller 91 carried by one arm of lever 90 as well as a connecting rod 92 pivotally connected to the other arm of lever 90.

The first mentioned angle lever 80 is rotatably mounted at its fulcrum by means of a journal 83 fixed to the machine housing and the latter angle lever 90 is rotatably mounted at its fulcrum by means of a journal 93 fixed to the machine housing. The two cams 8 and 9 are rigidly connected together.

In the operating phase illustrated in FIG. 1, the lowering channel 4 has just been filled with a stack of cookies B and therefore the lowering element 21 is in the lowermost position, which corresponds to the sensing roller 81 being in its position closest to the center of the cam 8.

As the two cams 8 and 9 rotate clockwise from the position shown in FIG. 1, the control rail 6 pivots counterclockwise about the journal 5, on the one hand, and thus the lowering element 21 is pivoted clockwise via the gear segment 23 and the toothed wheel 22 and therefore comes to lie outside of the range of the lowering channel 4. On the other hand, the lowering carriage 2 is pushed upwardly under control of lever 80. Thus the end of the lowering element 21 travels along the path 26.

Due to the fact that the lowering element 21 was pivoted outside the range of the lowering channel 4, the latter can be lowered to the second conveying device 10 in a free manner independent of the lowering element by rotation of the lowering channel 4 about the journal 40 which is fixed to the machine housing. Transfer of the stack of cookies B to the second conveying device 10 then takes place, again in a known manner.

As shown in FIG. 2, an aggregating member 30 retains the cookies B furnished on section 3 until the lowering element 21 has taken on its uppermost position and is thus perpendicular again to the longitudinal direction of this section 3. During the return movement of the lowering element 21 to its uppermost position, the transfer of objects from the lowering channel 4 to the second conveying device 10 may take place and the lowering channel 4 can be rotated back up again.

After the aggregating member 30 is raised to the position shown in FIG. 3, the cookies B on section 3 are taken over by the lowering element 21, as clearly shown in FIG. 3, and thus, as soon as the lowering channel 4 has reached its upper end position, the next group of objects can be advanced thereonto.

Thus, during the entire operating cycle of the lowering device, the ratio of lowering time to return time of the lowering carriage can be shifted in favor of the lowering time so that work can take place with lower acceleration forces, which results in quieter operation of the machine and gentler treatment of the cookies or other objects. The longer lasting lowering phase has a retroactive effect back to the group formation in that the danger of a break in the succession of objects due to some objects lying flat, and thus a malfunction in the supply operation, can be prevented or at least considerably reduced.

It will be understood that the above description of the present invention is susceptible to various modifications, changes and adaptations, and the same are intended to be comprehended within the meaning and range of equivalents of the appended claims.

What is claimed is:

1. In apparatus for transferring a group composed of a selected number of objects from a first conveying device to a second conveying device for supply, in groups, to a packaging machine, the improvement comprising: means defining a lowering channel which is pivotal between a first position in which it can receive a group of objects from said first conveying device, and a second position in which it can transfer each such group to said second conveying device; means supporting said lowering channel at one end for pivotal movement relative to a stationary axis at a location such that, when said lowering channel is in its first position the end of said lowering channel opposite to its one end is at a higher elevation than said one end; means defining a lowering element mounted for movement along said lowering channel for guiding a group of objects from said first conveying device onto said lowering channel; and means connected to said lowering element for displacing said lowering element, during pivoting of said lowering channel from said first position into said second position, upwardly toward the location of said lowering channel end opposite to its said one end when said lowering channel is in said first position, said means for displacing said lowering element comprising a lowering carriage on which said lowering element is pivotally mounted, and means for effecting pivoting of said lowering element relative to said lowering carriage out of the region occupied by a group of objects carried by said lowering channel when said lowering channel is in its said first position, and a stationarily mounted carriage guide presenting first guide path having one end in the vicinity of the outlet end of said first conveying device, with said lowering carriage being mounted in said guide for movement along said first guide path, and wherein said means for effecting pivoting of said lowering element comprise: a control rail pivotally mounted via one end on said carriage guide in the region of said one end of said guide path and presenting a second guide path; a slide block mounted in said rail for movement along said second guide path; a setting arm pivotally mounted at one end to said lowering carriage and at its other end to said slide block; means for transferring pivotal movement of said setting arm to pivot said lowering element; and drive means composed of a first cam, a first lever arm connected between said first cam and the end of said control rail opposite said one end thereof, a second cam, and a second lever arm connected between said second cam and said lowering carriage, said drive means acting to drive said control rail and said lowering carriage in synchronism for moving said lowering element along said lowering channel and for effecting such pivoting of said lowering element in order to displace said lowering element over a selected path.

2. Apparatus as defined in claim 1 wherein: said means for transferring pivotal movement is a toothed wheel concentric with the pivot axis of said lowering element; said setting arm is provided with a toothed wheel segment in meshing engagement with said toothed wheel for causing movement of said control rail to effect such pivoting of said lowering element.

3. Apparatus as defined in claim 1 wherein said means for displacing said lowering element further comprise means for advancing said lowering carriage toward said first conveying device during such pivoting of said lowering element.

* * * * *